US006151550A

United States Patent [19]
Nakatani

[11] Patent Number: 6,151,550
[45] Date of Patent: Nov. 21, 2000

[54] TRAFFIC INFORMATION PROVIDING SYSTEM

[75] Inventor: Mitsuo Nakatani, Tokyo, Japan

[73] Assignee: Mitsubishi Denki Kabushiki Kaisha, Tokyo, Japan

[21] Appl. No.: 09/235,405

[22] Filed: Jan. 22, 1999

[30] Foreign Application Priority Data

Jul. 9, 1998 [JP] Japan .................................. 10-194341

[51] Int. Cl.[7] .................................................. G06F 163/00
[52] U.S. Cl. ............................ 701/117; 340/905; 701/118
[58] Field of Search .................................... 701/117, 118, 701/119; 340/901, 902, 904, 905, 992, 993

[56] References Cited

U.S. PATENT DOCUMENTS

| | | | |
|---|---|---|---|
| 4,706,086 | 11/1987 | Panizza . | |
| 5,428,544 | 6/1995 | Shyu | 340/902 |
| 5,504,683 | 4/1996 | Gurmu et al. | 701/117 |
| 5,889,477 | 3/1999 | Fastenrath | 340/905 |
| 5,928,294 | 7/1999 | Zelinkovsky | 701/117 |
| 5,987,374 | 11/1999 | Akutsu et al. | 701/117 |

FOREIGN PATENT DOCUMENTS

| | | |
|---|---|---|
| 6-180795 | 6/1994 | Japan . |

*Primary Examiner*—Gary Chin
*Attorney, Agent, or Firm*—Sughrue, Mion, Zinn, Macpeak & Seas, PLLC

[57] ABSTRACT

To obtain a traffic information providing system which can display information of a forward section of an on-road radio transmission/reception device even if there is no oncoming vehicle. The on-vehicle radio transmission/reception device has a moving time calculation device for calculating moving times of traveling sections which are arbitrarily divided, a memory for storing the moving time calculated by the moving time calculation device, and a transmission device for transmitting the moving time; and the on-road radio reception device has a reception device for receiving a moving time from the moving time calculation device, a recognition unit for recognizing a traffic situation from the moving time to form traffic situation data, a data communication device for transmitting/receiving the traffic situation data between the plurality of on-road radio transmission/reception devices, and a display device for displaying the traffic situation data obtained by the data communication device.

5 Claims, 6 Drawing Sheets

TRAFFIC INFORMATION PROVIDING SYSTEM

BACKGROUND OF THE INVENTION

1. Field of the Invention

The present invention relates to a traffic information providing system for providing a display of traffic information and, more particularly, to a traffic information providing system in which, if even one vehicle on which an on-vehicle radio transmission/reception device is mounted passes through an on-road radio transmission/reception device, detailed traffic information can be provided to other vehicles by the on-road radio transmission/reception device.

2. Description of the Related Art

FIG. 6 is a view showing a conventional traffic information providing system described in Japanese Unexamined Patent Publication No. 6-180795. Referring to FIG. 6, on an automobile 1, various sensors such as a steering sensor, a direction sensor, and a vehicle speed sensor and a transmission/reception circuit are arranged. Steering angle data detected by the steering sensor, progress direction data detected by the direction sensor, vehicle speed data detected by the vehicle speed sensor are transmitted by the transmission/reception circuit through a transmission antenna 2. Data corresponding to these data and transmitted from another vehicle are received by the transmission/reception circuit of own vehicle and then transmitted in the same manner as described above.

A reception circuit and a controller are arranged in a traffic information display device 3 installed on a road such as a curve where visibility is not good. The presence/absence of occurrence of traffic jam, an accident, or the like is checked on the basis of data received by the reception circuit through a reception antenna 4, and a display content corresponding one of display contents of a plurality of preset types is selected to display the display content on a display part 5.

Therefore, when an automobile traveling in one lane receives data transmitted from an automobile jammed in the other lane, the data received from the other vehicle and the data of the own vehicle is transmitted to the display device 3. It is determined on the basis of the data received by the display device 3 that a traffic jam occurs in the other lane, and information which informs occurrence of a traffic jam is displayed on the display part 5 to provide traffic jam information to an automobile traveling in the other lane.

In the traffic information providing system with the above arrangement, a forward traffic situation can be recognized by a backward vehicle.

However, a conventional traffic information providing system with the above arrangement has the following problems:

(1) If there is no oncoming vehicle, information of a forward section of a display device 3 cannot be obtained.

(2) Since a relative speed is high in inter-vehicle communication, a high-speed data communication means is required.

(3) If the distance between display devices 3 is long, a large amount of data of each vehicle must be transmitted and received to obtain detailed information in the section between the display devices 3.

SUMMARY OF THE INVENTION

The present invention has been made to solve the above problems, and has as its object to obtain a traffic information providing system which can display information of a forward section of an on-road radio transmission/reception device even if no oncoming vehicle, can use a narrow-band communication scheme used in an automatic charge collection apparatus, and, even if the distance between on-road radio transmission/reception devices is long, can provide detailed information of the section between the on-road radio transmission/reception devices.

A traffic information providing system according to the present invention includes an on-vehicle radio transmission/reception device mounted on a vehicle and a plurality of on-road radio transmission/reception devices installed on roads, wherein the on-vehicle radio transmission/reception device has: a moving time calculation device for calculating moving times of traveling sections which are arbitrarily divided; a moving time storage device for storing the moving time calculated by the moving time calculation device; and a transmission device for transmitting the moving time, and the on-road radio transmission/reception device has a reception device for receiving the moving time from the on-vehicle radio transmission/reception device; a traffic situation recognition device for comparing the moving time with a preset reference time to form traffic situation data; a data communication device for transmitting/receiving the traffic situation data between the plurality of on-road radio transmission/reception devices; and a display device for displaying the traffic situation data obtained by the data communication device.

The moving time calculation device has a traveling distance detection device for outputting a traveling distance and a timer device for outputting time and calculates a moving time of each traveling section by using the traveling distance detection device and the timer device.

The on-road radio transmission/reception device has a traveling section information storage device for storing traveling section information serving as information of a plurality of traveling sections in advance and a traveling section information transmission device for transmitting the traveling section information to the on-vehicle radio transmission/reception device, and the moving time calculation device has a traveling distance detection device for outputting a traveling distance and a timer device for outputting time and calculates a moving time of each traveling section based on the traveling section information by using the traveling distance detection device and the timer device.

The on-road radio transmission/reception device has a display information transmission device for transmitting display information displayed by the display device to the on-vehicle radio transmission/reception device, and the on-vehicle radio transmission/reception device has a vehicle-side display device for providing the display information to a driver.

In addition, the on-vehicle radio transmission/reception device and the on-road radio transmission/reception device perform transmission/reception by using a narrow-band communication scheme of an advanced road traffic system.

DESCRIPTION OF THE PREFERRED EMBODIMENTS

Embodiment 1

Figure 1:
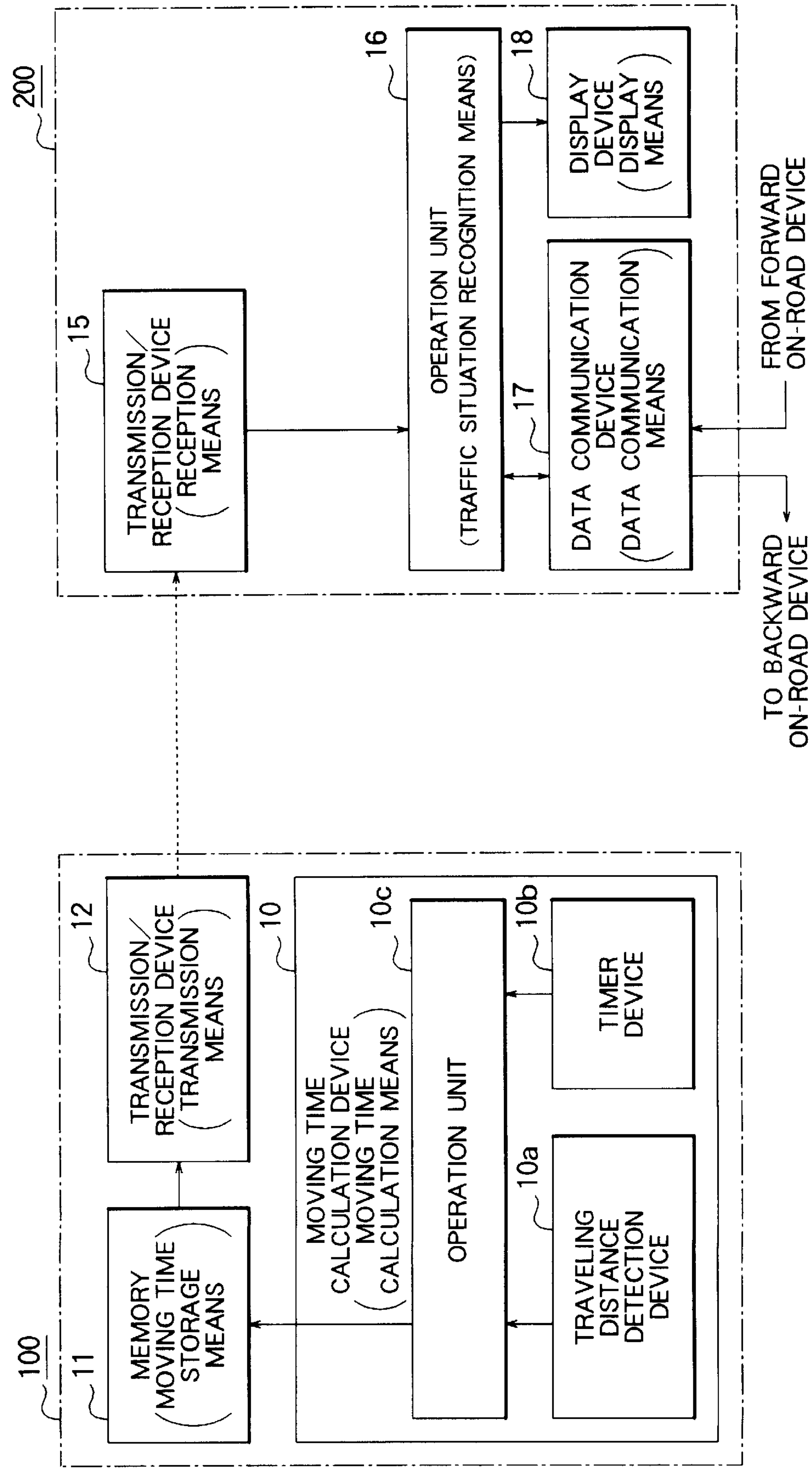
FIG. 1 is a concept view showing a traffic information providing system according to the present invention.

FIG. 1 is a concept view showing a traffic information providing system according to this invention. The traffic information providing system is constituted by an on-vehicle radio transmission/reception device 100 mounted on a vehicle and a plurality of on-road radio transmission/reception devices 200 installed on a road. The plurality of on-road radio transmission/reception devices 200 are installed on the roadside of, e.g., a road at predetermined intervals along the road.

In the on-vehicle radio transmission/reception device 100 mounted on the vehicle, a moving time calculation device 10 serving as a moving time calculation means constituted by a traveling distance detection device 10*a*, a timer device 10*b*, and an operation unit 10*c*, a memory 11 serving as a moving time storage means, and a transmission/reception device 12 serving as a transmission means are arranged. The moving time calculation device 10 calculates a required time (moving time) of each of traveling sections arbitrarily divided on the basis of a pre-stored sectional distance. More specifically, the operation unit 10*c* of the moving time calculation device 10 calculates the required time of each traveling section on the basis of a traveling distance obtained by the traveling distance detection device 10*a* and time obtained by the timer device 10*b*.

Although a measurement start point of a traveling section is arbitrarily set, the measurement start point may be set such that measurement is started when a vehicle passes through, e.g., a certain on-road radio transmission/reception device 200. Calculated required times of traveling sections are sequentially stored in the memory 11. When a vehicle passes through a position where the on-vehicle radio transmission/reception device 100 is installed, data stored in the memory 11 is transmitted to the on-road radio transmission/reception device 200 through the transmission/reception device 12. After the data is transmitted to the on-road radio transmission/reception device 200, the memory 11 is reset, and the measurement is started by using this point as a new measurement start point.

On the other hand, in the on-road radio transmission/reception device 200 installed on the road, a transmission/reception device 15 serving as a reception means, an operation unit 16 serving as a recognition means for recognizing traffic information, a data communication device 17 serving as a data communication means, and a display device 18 serving as a display means. The on-road radio transmission/reception device 200 causes the operation unit 16 to process data received from the on-vehicle radio transmission/reception device 100 through the transmission/reception device 15, calculates a required time, a traveling speed, and the like, serving as traffic situation data, of a desired section, and transmits the data to the backward on-road radio transmission/reception device 200 through the data communication device 17. The on-road radio transmission/reception device 200 transmits the data to the backward on-road radio transmission/reception device 200 through the data communication device 17, and displays information, which is received from the forward on-road radio transmission/reception device 200, on the display device 18.

Data transmission/reception between the transmission/reception device 12 of the on-vehicle radio transmission/reception device 100 and the transmission/reception device 15 of the on-road radio transmission/reception device 200 uses a narrow-band communication scheme of an advanced road traffic system used in, e.g., an automatic charge collection apparatus or the like. On the other hand, although data transmission/reception between the plurality of on-road radio transmission/reception devices 200 installed on a road uses wire communication using cables or telephone lines buried in the ground, radio communication may be used.

Figure 2:
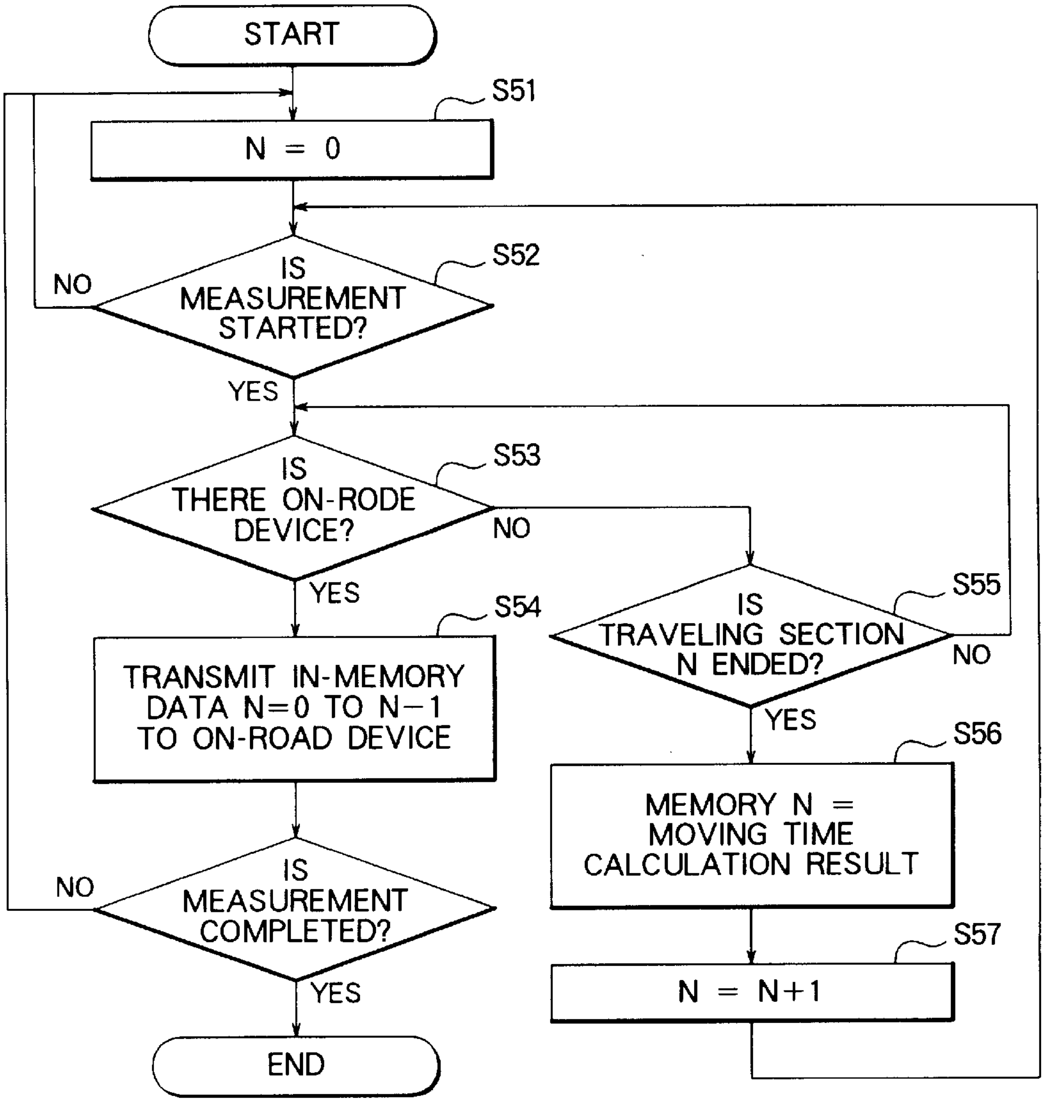
FIG. 2 is a flow chart showing the operation of an on-vehicle radio transmission/reception device.

FIG. 2 is a flow chart showing the operation of the on-vehicle radio transmission/reception device 100. The on-vehicle radio transmission/reception device 100 sets a counter to be 0 (step S51), and waits for the timing of the start of measurement (step S52). Thereafter, when the vehicle passes through a position near the on-road radio transmission/reception device 200 (step S53), data in the memory 11 is transmitted to the on-road radio transmission/reception device 200 (step S54).

When the vehicle travels a predetermined traveling distance before the vehicle reaches the on-road radio transmission/reception device 200, i.e., when a predetermined traveling section is ended (step S55), a required time, a traveling speed, and the like are calculated to be stored in the Nth area of the memory 11 (step S56). Thereafter, the counter is incremented by 1 (step S57) to start measurement again.

Figure 3:
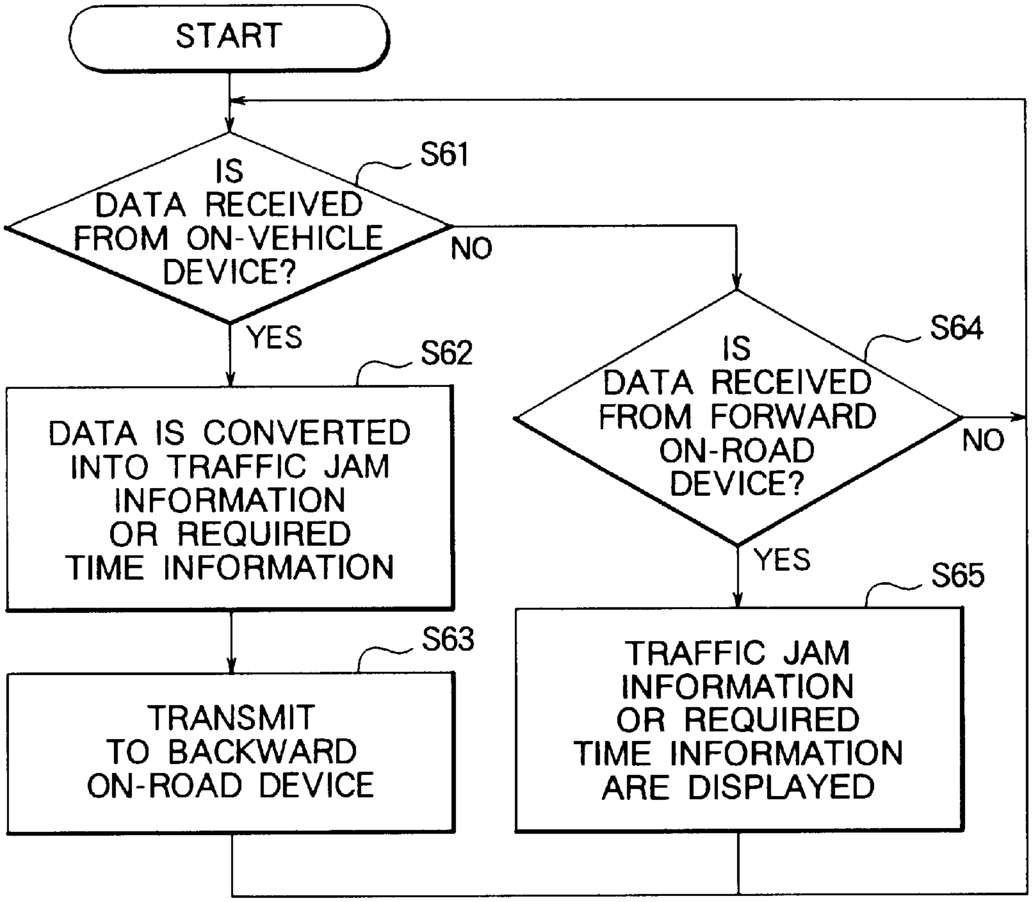
FIG. 3 is a flow chart showing the operation of an on-road radio transmission/reception device.

FIG. 3 is a flow chart showing the operation of the on-road radio transmission/reception device 200. In the on-road radio transmission/reception device 200, when a vehicle passes through a position near the on-road radio transmission/reception device 200 to receive data (step S61), and the data is converted into traffic jam information or required time information to display the corresponding information on the display device 18 (step S62). In addition, the data is transmitted to the backward on-road radio transmission/reception device 200 (step S63). On the other hand, when data from the vehicle is not received, and data is transmitted from the forward on-road radio transmission/reception device 200 (step S64), the data is converted into traffic jam information or required time information to display the corresponding information on the display device 18 (step S65).

In the traffic information providing system arranged as described above, even if there is no oncoming vehicle, information of a forward section can be displayed on the on-road radio transmission/reception device 200. Since a vehicle transmits/receives data to/from the on-road radio transmission/reception device 200, the positional relationship between pieces of information obtained by the vehicle becomes clear, and the reliability of traffic situation data is improved. Communication between the vehicle and the on-road radio transmission/reception device 200 can be performed by using a narrow-band communication scheme used in an automatic charge collection apparatus or the like. Furthermore, even if the distance between the on-road radio transmission/reception devices 200 is long, detailed information of the section between the on-road radio transmission/reception devices 200 can be reliably provided.

Embodiment 2

Figure 4:
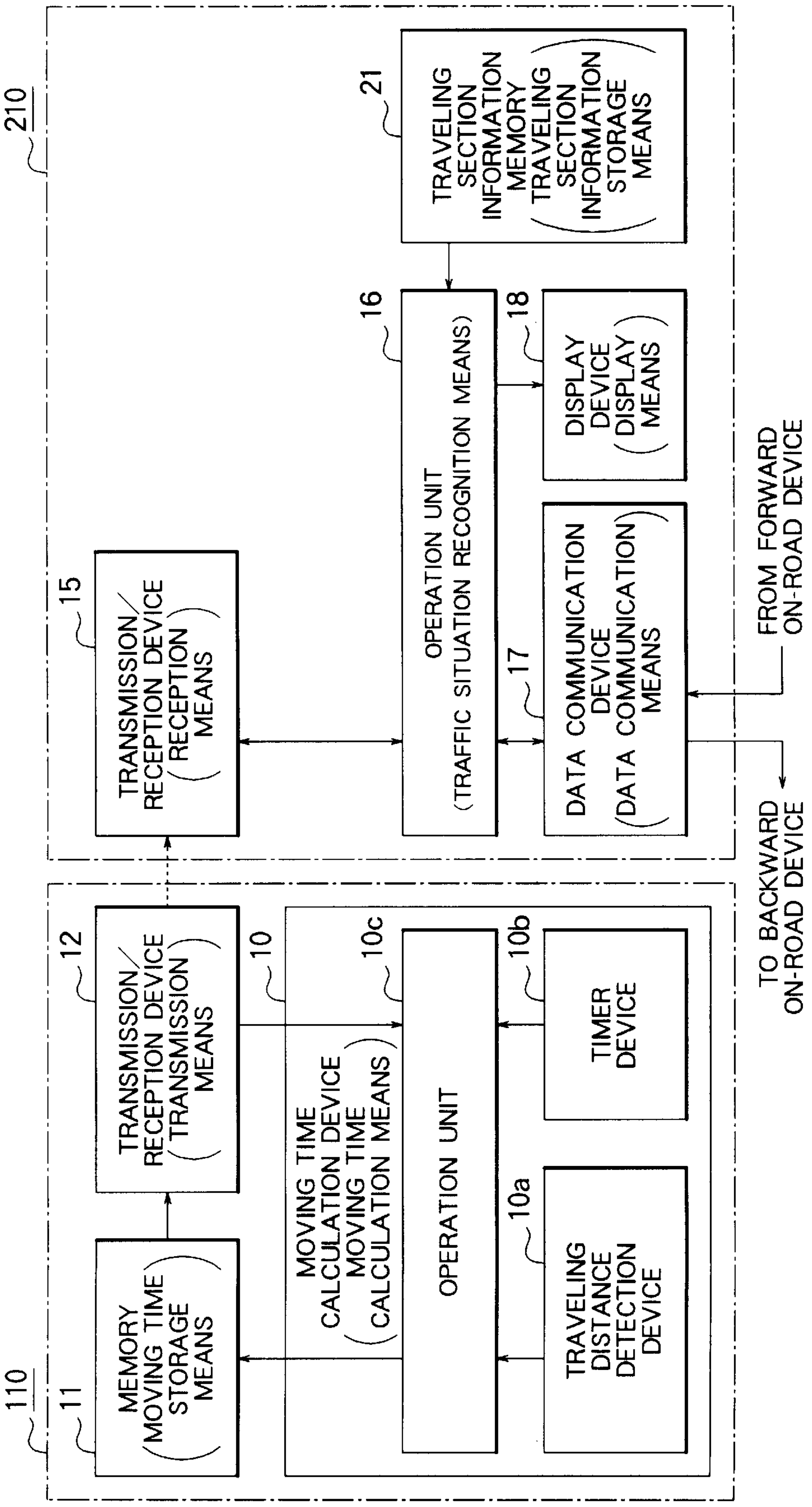
FIG. 4 is a concept view showing another traffic information providing system according to this invention.

FIG. 4 is a concept view showing another traffic information providing system according to this invention. An on-road radio transmission/reception device 210 according to this embodiment has a traveling section information memory 21 serving as a traveling section information storage means. In the traveling section information memory 20, pieces of traveling section information divided depending on a distance to the next on-road radio transmission/reception device 210, past traffic jam situations, and the like are stored.

The traveling section information includes, e.g., the length of a section to be measured and the number of sections to be measured. For example, since a traffic jam easily occurs at a position having many curves and waves or a position having many intersections, the position should be divided into many short sections. On the other hand, since a traffic jam does not easily occur at a position where a long straight road continues, the position can be divided into large sections without any problem. In this embodiment, the on-road radio transmission/reception device 210 has traveling section information to divide these sections on the basis of the position of the on-road radio transmission/reception device 210 itself.

When a vehicle passes through a position near the on-road radio transmission/reception device 210, the on-road radio transmission/reception device 210 transmits the traveling section information to the vehicle through a transmission/reception device 15 serving as a traveling section information transmission means. An on-vehicle radio transmission/reception device 110 receiving the transmitted traveling section information calculates a desired time of each section on the basis of the traveling section information, stores the calculation result in a memory 11, and transmits the calculation result to the on-road radio transmission/reception device 210. The on-road radio transmission/reception device 210 forms traffic jam information or required time information serving as a traffic situation data on the basis of the transmitted data to display the corresponding information on a display device 18.

The other arrangement of this embodiment is the same as that of Embodiment 1.

In the traffic information providing system arranged as described above, traffic information of a necessary section can be made detailed. By limiting the number of divided traveling sections, the memory 11 of the on-vehicle radio transmission/reception device 110 can be effectively used.

Embodiment 3

Figure 5:
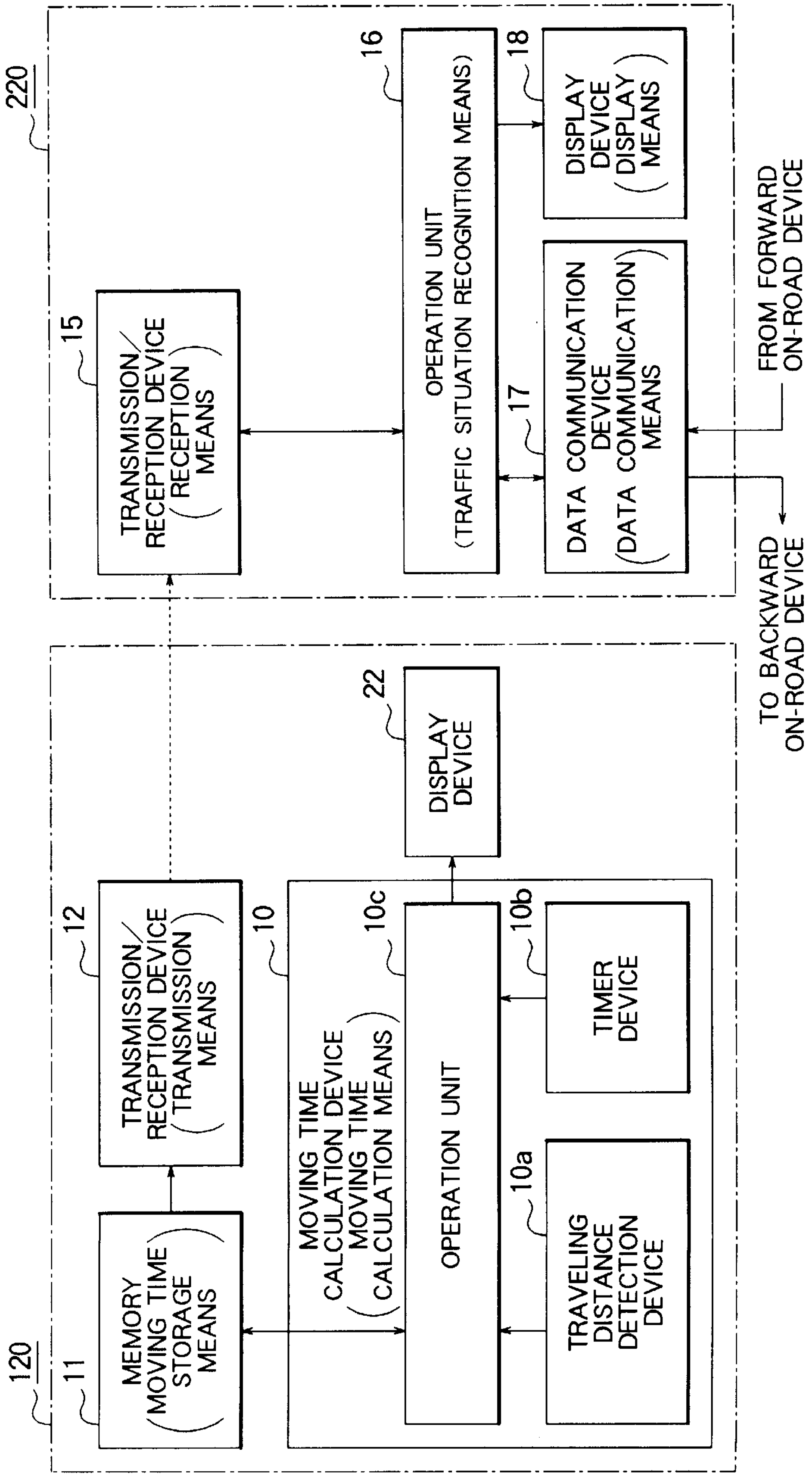
FIG. 5 is a concept view showing still another traffic information providing system according to this invention.
Figure 6:
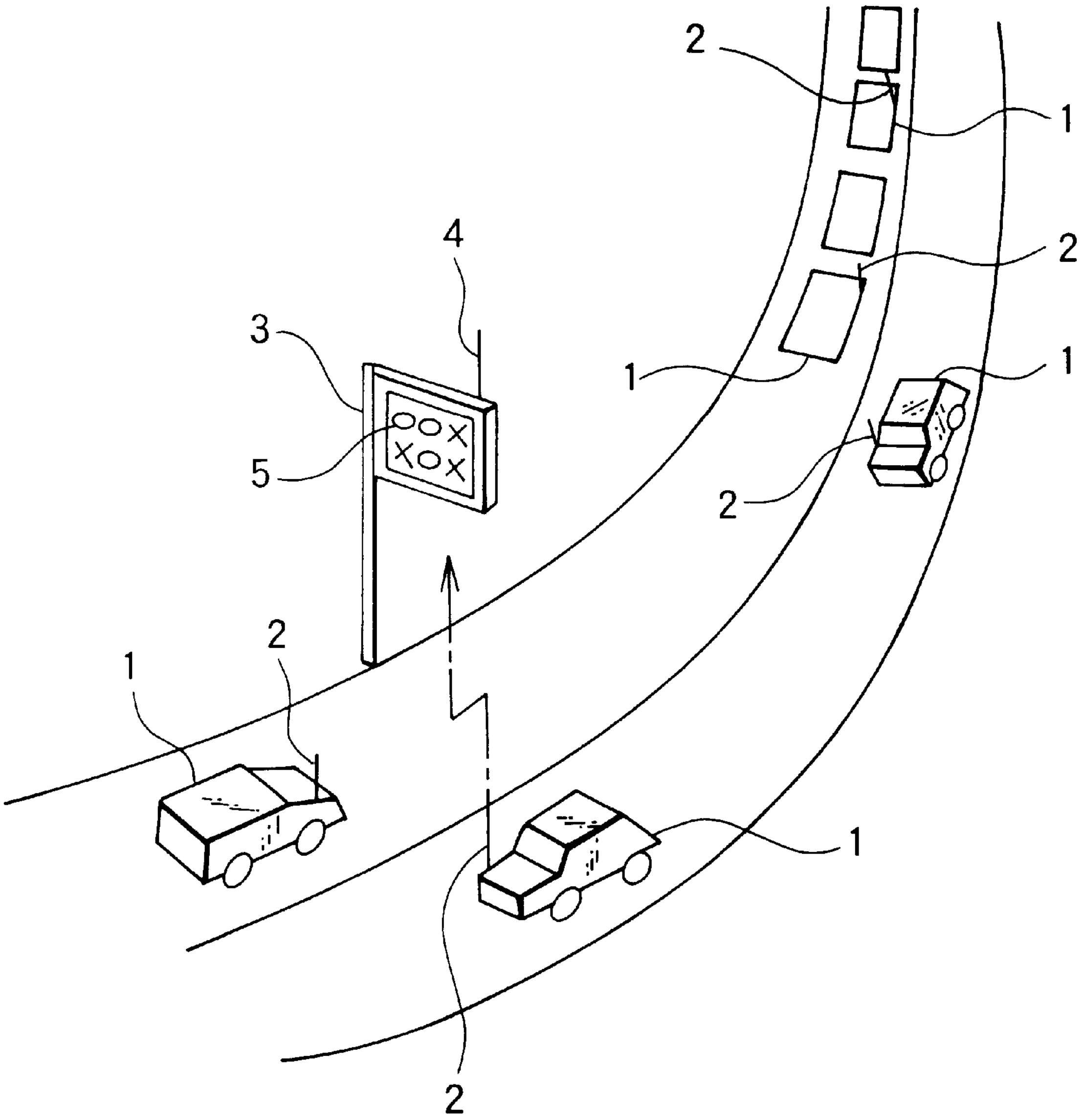
FIG. 6 PRIOR ART
FIG. 6 is a view showing a conventional traffic information providing system.

FIG. 5 is a concept view showing still another traffic information providing system according to this invention. An on-vehicle radio transmission/reception device 120 according to this embodiment has a vehicle-side display device 22 serving as a vehicle-side display means. The vehicle-side display device 22 has a switch or the like formed thereon, and is applied with a power source voltage as needed.

When an on-road radio transmission/reception device 220 transmits/receives data to/from the on-vehicle radio transmission/reception device 120, the on-road radio transmission/reception device 220 transmits information displayed on the display device 18 through a transmission/reception device 15 serving as a display information transmission means. The on-vehicle radio transmission/reception device 120 receives the information to store the information in a memory 11. This information is displayed as needed when a drive wants to check the information by the vehicle-side display device 22.

The other arrangement of this embodiment is the same as that of Embodiment 1.

In the traffic information providing system arranged as described above, data displayed on the display device 18 of the on-road radio transmission/reception device 220 is received by the on-vehicle radio transmission/reception device 120, and the received information is stored in the memory 11, so that the contents of the memory 11 can be displayed at any time on the vehicle-side display device 22 in the vehicle. For this reason, when the driver misses the contents on the display device 18 of the on-road radio transmission/reception device 220, the driver can check the information again at any time.

A traffic information providing system according to this invention is constituted by an on-vehicle radio transmission/reception device mounted on a vehicle and a plurality of on-road radio transmission/reception devices installed on a road. The on-vehicle radio transmission/reception device has a moving time calculation means for calculating moving times of traveling sections which are arbitrarily divided, a moving time storage means for storing the moving time calculated by the moving time calculation means, and transmission means for transmitting the moving time. The on-road radio transmission/reception device has a reception means for receiving said moving time from the on-vehicle radio transmission/reception device, a traffic situation recognition means for comparing the moving time with a preset reference time to form traffic situation data, a data communication means for transmitting/receiving the traffic situation data between the plurality of on-road radio transmission/reception devices, and a display means for displaying the traffic situation data obtained by the data communication means. For this reason, even if there is no oncoming vehicle, information of a forward section of the on-road radio transmission/reception device can be displayed and provided to a driver. A narrow-band communication scheme used in an automatic charge collection apparatus or the like can be used. In addition, the positional relationship between pieces of information obtained by the vehicle becomes clear, and the reliability of traffic situation data is improved.

The moving time calculation means has a traveling distance detection device for outputting a traveling distance and a timer device for outputting time and calculates a moving time of each traveling section by using the traveling distance detection device and the timer device. For this reason, the traveling sections can be easily partitioned.

The on-road radio transmission/reception device has a traveling section information storage means for storing traveling section information serving as information of a plurality of traveling sections in advance and a traveling section information transmission means for transmitting the traveling section information to the on-vehicle radio transmission/reception device, and the moving time calculation means has a traveling distance detection device for outputting a traveling distance and a timer device for outputting time and calculates a moving time of each traveling section based on the traveling section information by using the traveling distance detection device and the timer device. For this reason, traffic information of a necessary section can be made detailed. By limiting the number of divided traveling sections, the moving time calculation means of the on-vehicle radio transmission/reception device can be effectively used.

The on-road radio transmission/reception device has a display information transmission means for transmitting display information displayed by a display means to the on-vehicle radio transmission/reception device, and the on-vehicle radio transmission/reception device has a vehicle-side display means for providing display information to a driver. For this reason, when the driver misses the contents on the display means of the on-road radio transmission/reception device, the driver can check the information again at any time.

In addition, the on-vehicle radio transmission/reception device and the on-road radio transmission/reception device perform transmission/reception by using a narrow-band communication scheme of an advanced road traffic system. For this reason, a simple communication method can be used, and cost reduction can be achieved.

What is claimed is:

1. A traffic information providing system comprising an on-vehicle radio transmission/reception device mounted on a vehicle and a plurality of on-road radio transmission/reception devices installed on roads, wherein said on-vehicle radio transmission/reception device has:

moving time calculation means for calculating moving times of traveling sections which are arbitrarily divided;

moving time storage means for storing the moving time calculated by said moving time calculation means; and transmission means for transmitting the moving time, and said on-road radio transmission/reception device has:

reception means for receiving said moving time from said on-vehicle radio transmission/reception device;

traffic situation recognition means for comparing said moving time with a preset reference time to form traffic situation data;

data communication means for transmitting/receiving said traffic situation data between said plurality of on-road radio transmission/reception devices; and display means for displaying said traffic situation data obtained by said data communication means.

2. A traffic information providing system according to claim 1, characterized in that said moving time calculation means has a traveling distance detection device for outputting a traveling distance and a timer device for outputting time and calculates a moving time of each traveling section by using said traveling distance detection device and said timer device.

3. A traffic information providing system according to claim 1, characterized in that said on-road radio transmission/reception device has traveling section information storage means for storing traveling section information serving as information of a plurality of traveling sections in advance and traveling section information transmission means for transmitting said traveling section information to said on-vehicle radio transmission/reception device, and said moving time calculation means has a traveling distance detection device for outputting a traveling distance and a timer device for outputting time and calculates a moving time of each traveling section based on said traveling section information by using said traveling distance detection device and said timer device.

4. A traffic information providing system according to claim 1, characterized in that said on-road radio transmission/reception device has display information transmission means for transmitting display information displayed by said display means to said on-vehicle radio transmission/reception device, and said on-vehicle radio transmission/reception device has vehicle-side display means for providing said display information to a driver.

5. A traffic information providing system according to claim 1, characterized in that said on-vehicle radio transmission/reception device and said on-road radio transmission/reception device perform transmission/reception by using a narrow-band communication scheme of an advanced road traffic system.

* * * * *